United States Patent [19]

Mine et al.

[11] Patent Number: 4,698,280
[45] Date of Patent: Oct. 6, 1987

[54] MAGNETIC RECORDING MEDIUM

[75] Inventors: Kiyomitsu Mine; Yayoi Kobayashi; Yasushi Kawaguchi; Hiroyuki Inokuma, all of Hino, Japan

[73] Assignee: Konishiroku Photo Industry Co., Ltd., Tokyo, Japan

[21] Appl. No.: 773,808

[22] Filed: Sep. 9, 1985

[30] Foreign Application Priority Data

Sep. 14, 1984 [JP] Japan .................................. 59-193152
Mar. 20, 1985 [JP] Japan .................................. 60-54382

[51] Int. Cl.$^4$ .................................................. G11B 5/72
[52] U.S. Cl. ............................... 428/425.9; 252/62.54; 427/128; 427/131; 428/694; 428/695; 428/900
[58] Field of Search ............... 428/694, 900, 329, 695, 428/425.9; 427/44, 131, 128; 252/62.54; 360/134–136

[56] References Cited

U.S. PATENT DOCUMENTS

| 3,404,997 | 10/1968 | Jacobson | 252/62.54 |
| 3,922,389 | 11/1975 | Toledo | 427/131 |
| 4,171,399 | 10/1979 | Allen | 428/695 |
| 4,189,514 | 2/1980 | Johnson | 427/131 |
| 4,315,057 | 2/1982 | Horigome | 428/900 |
| 4,337,288 | 6/1982 | Takenaka | 427/128 |
| 4,407,853 | 10/1983 | Okita | 427/44 |
| 4,414,271 | 11/1983 | Kitamoto | 428/695 |
| 4,425,404 | 1/1984 | Suzuki | 428/695 |
| 4,544,601 | 10/1985 | Yamaguchi | 428/695 |

FOREIGN PATENT DOCUMENTS 072646 4/1984 Japan .................................. 428/329

Primary Examiner—Ellis P. Robinson
Attorney, Agent, or Firm—Jordan B. Bierman

[57] ABSTRACT

A magnetic recording medium having a magnetic layer and optionally a backing layer, wherein at least one of said magnetic layer and said backing layer contains a fungicide selected from the group consisting of 2-(4-thiazolyl) benzimidazole, N-(fluorodichloromethylthio)-phthalimide, N,N-dimethyl-N'-phenyl-N'-fluorodichloromethylthio-sulfamide.

12 Claims, No Drawings

MAGNETIC RECORDING MEDIUM

BACKGROUND OF THE INVENTION

This invention relates to a magnetic recording medium, and more particularly to a magnetic recording medium containing an fungicide in both of the magnetic layer thereof and at least one of the backing layers provided onto the opposite side of the support tnereof to the magnetic layer.

Generally speaking, a magnetic recording medium comprises a magnetic layer formed by coating over a support such as polyethyleneterephthalate film with a magnetic paint prepared by mixing and dispersing magnetic powders in binders, and then by drying it.

Such magnetic recording media are popularly used in the fields of audios, videos. computers and the like in the forms of magnetic tapes, magnetic disks, magnetic sheets, floppy disks and the like.

In the magnetic recording tapes used for the above-mentioned purposes the surface of the magnetic recording layer is smoothly finished in general, with the purpose of improving the sensitivity, especially the output from a high frequency region. Such smooth-surfaced magnetic recording tapes are apt to be wound up irregularly, because the tapes are not properly taken up when taking up or rewinding. If using an irregularly wound magnetic recording tape such as mentioned above, there causes a defect that the tape runnability is worsened and the output is fluctuated, because of the variation of the tension. In addition to the above, tapes are apt to be deformed and damaged. To avoid the above-mentioned defects, there has been proposed a magnetic recording tape provided a backing layer over to the opposite surface of a support to a magnetic recording layer.

Such backing layer is also effective to reduce frictional resistance between tapes or to improve tne charging properties.

To serve as the binders of the above-mentioned magnetic layer and backing layer, a thermoplastic resin or thermosetting resin such as synthetic resins including, for example, a vinyl chloride-vinyl acetate copolymer resin, a cellulose derivative, an epoxy resin, a polyvinyl outyral, a polyurethane resin, a synthetic rubber resin, an acryl resin, a polyester resin, and the like. However, on the surface or inside of the magnetic layer and backing layer each formed oy using the above-mentioned synthetic resins to serve as the binder, microorganisms such as fungus (e.g., Aspergillus penicilloides, *Chaetomium globosum, Cladosporium herbarum*, Trichoderma sp. and the like) are apt to be produced. Inter alia, binders made of polyurethane resin are apt to produce microorganisms (i.e., fungus), and if such microorganisms are produced in a magnetic layer, there causes undesired troubles such as a delamination of the magnetic layer caused by adhering to each other tape, contamintion of a recording head, impediment to the tape flatness, erroneous signal of tapes or disks, and the like. If such microorganisms are produced in a backing layer, a tape which was taken up adheres to each other side so as not to separate and is apt to be torn when the microorganisms are grown up.

Fungus which peeled off from a tape may contaminate a magnetic head or damage the smoothness of the tape because of adhering to the surface of the tape. Tapes are used in great numbers for personal hobby and industrial purposes, and among them, there are some tapes which are desired to preserve for a long time as valuable collections and required to have a high reliability to serve as an external recording medium for a computer. It is, therefore, eagerly desired to take a countermeasure to prevent the damages caused by getting fungus.

Accordingly, various countermeasures have been proposed with the purpose of preventing fungus to the utmost, and some of them have actually been put in practice. For example, Yamano, 'Journal of Antibacterial and Antifungal Agents, Japan' 4[10], 487 (1976) describes the improvement of environmental conditions, the selection of synthetic resin materials and the method of using chemicals for preventing fungus. However, such proposals have not been applied to any magnetic recording medium and have also lacked the feasioility. Especially, the selection of chemicals are difficult to prevent such a microorganisms as fungus and the like because of tne magnetic property, durability, drop-out and the like. It is the state of things that any of the suitable chemicals has still not been found to use.

It is an object of the invention to provide a magnetic recording medium getting no or relatively less microorganisms such as fungus with the use of an fungicide.

Another object of the invention is to provide a magnetic recording medium which is excellent in durability, from which microorganisms such as fungus are reduced or got rid of.

A further object of the invention is to provide a magnetic recording medium displaying an excellent magnetic property, from which the microorganisms such as fungus are reduced or got rid of.

Yet another object of the invention is to provide a magnetic recording medium containing the fungicide which is high in safety to human body.

A still further object of the invention is to provide a magnetic recording medium whose magnetic layer and backing layer do not adhere to each other when the magnetic recording medium is taken up.

An additional object of the invention is to provide a magnetic recording medium which is properly taken up when being wound and rewound and is excellent in running stability.

SUMMARY OF THE INVENTION

The above-mentioned object of the invention can be achieved by containing at least one of specific fungicides in the binders of at least one layer of the magnetic layer and backing layer of a magnetic recording medium. Further, the above-mentioned first and fourth object of the invention can very easily be achieved when the binder contains polyurethane resin.

DETAILED DESCRIPTION OF THE INVENTION

Binders which are to be used for forming the magnetic layers of a magnetic recording medium of the invention include, for example, a synthetic resin such as vinyl chloride-vinyl acetate copolymer resins, a cellulose derivatives, an epoxy resin, a polyvinylbutyral, a polyurethane resin, an acryl resin, a polyester resins and the like. Among them, polyuretnane resins are preferred to serve as the binders used for achieving the above-mentioned first and fourth objects of the invention. In the invention, the fungicide effects are remarkably displayed when the raw material of the binders of the magnetic layer or backing layer contains a polyurethane resin. Such polyurethane resins may be used in the whole amount or a part thereof to serve as such binders. When using a part of the polyurethane resins to serve as the binders, other synthetic resins capable of being used jointly to serve as the binders include, for example, a vinyl chloride-vinyl acetate copolymer resin, a nitrocellulose, and polyvinyloutyral. The typical examples of the preferred combination thereof include, a combination of polyurethane resin and vinyl chloride-vinyl acetate-polyvinylbutyral copolymer resin.

Almost any of the polyurethane resins on the markets may preferably be used in the invention. Namely, a polyester polyurethane resin and polyether polyurethane resin prepared by urethanating a polyester polyol obtained by the reaction of an organic dibasic acid such as phthalic acid, adipic acid or maleic acid with a glycol such as ethylene glycol, propylene glycol, butylene glycol, diethylene glycol or the like, or with a polyvalent alcohol such as trimethylol propane, hexanetriol, glycerol, trimethylolethane, pentaerythritol or the like, by a polyisocyanate compound such as tolylenediisocyanate, hexamethylenediisocyanate, 4,4'-diphenylmethanediisocyanate, methaxylylenediisocyanate or the like; a polyether polyurethane resin; and further those having a

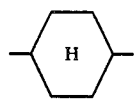

ring in the skeleton of a molecule represented by tne following Formula [I],

[$+$O—R—OOC—R'—CO$+_m$OROOCNH—R"-NHCO$+$]  Formula [I]

wherein m is an integer of from 5 to 100; R represents a divalent group that is a residual group of an alicyclic or aromatic compound having at least two hydroxyalkyl groups each having 1 to 4 carbon atoms or at least two hydroxyalkoxy groups each having 1 to 4 carbon atoms; R' represents

R" represents

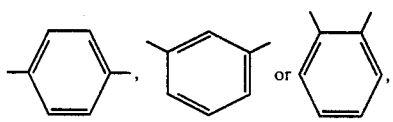

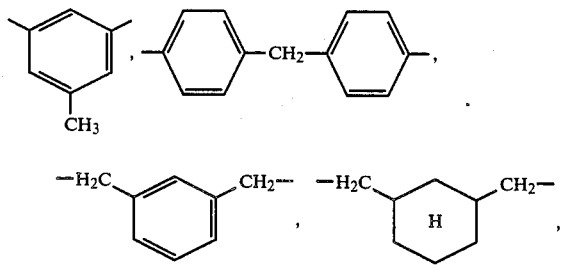

or $+CH_2+_n$ in which n is an integer of from 4 to 6.

The effective molecular weight thereof is from 5,000 to 500,000 and more preferably from 10,000 to 200,000. These polyurethanes are described in, for example, Japanese patent O.P.I. Public Inspection No. 26880/1979.

Polyurethane resins which are to be used in the invention may be a urethane resin containing a free isocyanate or a hydroxy group, or may be in the form of a urethane prepolymer, and may further be those not containing these reactive terminal groups including, for example, those in the form of a urethane elastomer.

There are well known in the skilled in the art about the preparation processes, curing cross-linking processes and the like, therefore, the description thereof will be omitted.

It is preferred that the fungicides capable of being used in a magnetic recording medium of the invention may be able to safisfy the following requirements as many as possible:

(1) A great fungicide effect can be enjoyed even in a small amount used.
(2) High security of human body can oe assured.
(3) Aftereffects are to be high.
(4) It has no offensive smell.
(5) It is to be dissolved in such a binder solvent as methylethyl ketone or the like.

Next, the following exemplified compounds are given as the tyical examples of fungicides capable of being preferably used in the invention and satisfying the above-mentioned requirements, and it is to be understood that the invention shall not be limited to the above-mentioned exemplified compounds.

[Exemplified Compounds]

(1) 2-(4-thiazolyl)benzimidazole,
(2) α-bromcinnamaldehyde,
(3) o-phenylphenol,
(4) N-(fluorodichloromethylthio)-phthalimide,
(5) N,N-dimethyl-N'-phenyl-N'-fluorodichloromethyl-thiosulfamide,
(6) 2,3,5,6-tetrachloro-4-methylsulfonyl-pyridine,
(7) 2-octylisothiazoline-3-one,
(8) hexahydro-1,3,5-tris(2-hydroxyethyl)-sym-triazine,
(9) benzylbromoacetate,
(10) 2-pyridinethiol sodium-1-oxide,
(11) 1,2-benzoisothiazoline-3-one,
(12) potassium-N-hydroxymethyl-N-methylthiocarbamate,
(13) 2,4,5,6-tetrachloroisophthalonitrile,
(14) dithio-2',2'bis(benzomethylamide), and
(15) salicylanilide.

Such fungicides as mentioned above may suitably be selected according to the structures or the usage of magnetic recording media used, and among them the following exemplified compounds are particularly preferred to use from the whole viewpoint of the aforementioned requirements: Exemplified Compounds (1), (4), (5), (6), (7), (8), (9), (10), (12) and (14).

These fungicides can be available from such a manufacturer as Sanai Petroleum Co., Ltd., Permachem Asia Ltd., Bayer Japan Ltd., Shinto Paint Co., Ltd., Sakai Chemical Industry Co., Ltd., and the like.

The amount of these fungicides to be added depends on the kinds thereof, and it is however from 10 to 5,000 ppm to dried binders, and more preferably from 100 to 2,000 ppm.

To contain one or more kinds of tne above-mentioned fungicides in the magnetic layer of backing layer of a magnetic recording medium of the invention, it is good enough only to follow such a process that the fungicide is dissolved in one or more kinds of such an organic solvent as acetone, methylethyl ketone, methyl isobutyl ketone, cyclohexanone, methanol, ethanol, ethyl acetate, dioxane, toluene, methylene chloride and the like, or a solution the market is mixed in a binder solution, and the resulting solution is coated and dried.

Besides the above, the magnetic layer backing layer of the invention are also allowed to contain a low molecular compound, a high molecular compound, or a solid particle, such as a lubricant, an antielectrostatic agent and the like.

The polyurethane resins which are preferably used in the invention are further allowed to jointly use with such a solid particle as carbon black, alumina and the like, so as to improve various properties such as dispersibility, durability and so forth.

The thickness of such magnetic layer of the invention is of the order from 0.1 to 5 μm, and more preferably from 0.2 to 3 μm.

The thickness of such backing layer relating to the invention is the same as that of an ordinary backing layer, and preferably it is of the order of from about 0.1 to 5 μm, further more preferably from 0.2 to 3 μm.

It is also allowed that the magnetic layer and backing layer of the invention may be added therein with an isocyanate (including a low molecular weight isocyanate or polyisocyanate) so as to easily be hardened.

Lubricants which are preferably used in the backing layers include, for example, a darkened solid particle having a low friction coefficient. The recommendable solid particles are of from 0.05 to 10 μm in average particle size, and more preferably from 0.1 to 2 μm. Typical examples of such lubricants include graphite, carbon black, graft-polymer, tungsten disulfide, molybdenum disulfide and the like.

The above-mentioned lubricants are used in an amount of not more than equivalent and more preferably from 5 to 45 parts by weight per 100 parts by weight of urethane resin. The lubricants may also be allowed to mix up with other resins.

The lubricants capable of being used in magnetic layers include, for example, silicone oil, carbon black, graphite, molybdenum disulfide, tungsten disulfide, and a fatty acid ester (i.e., the so-called wax) comprising a monobasic fat having 12 to 16 carbon atoms and a monovalent alcohol having 21 to 23 carbon atoms in total when added by the carbon atoms of the fatty acid. These lubricants are added in an amount within the range from 0.2 to 20 parts by weight per 100 parts oy weight of the binders. These lubricants are described in, for example, Japanese Patent Examined Publication Nos. 23889/1968 and 81543/1968; U.S. Pat. Nos. 3,470,021, 3,492,235, 3,497,411, 3,523,086, 3,625,720, 3,630,772, 3,634,253, 3,642,539 and 3,687,725; IBM Technical Disclosure Bulletin, Vol. 9, No. 9, p. 779, December, 1966; Elektronik, No. 12, p. 380, 1961; and the like.

The antistatic agents to be used include, for example, such as electroconductive powder as graphite, carbon black, carbon black graft-polymer and the like; such a nonionic surfactant as an alkylene oxide, a glycerol or glycidol surfactant and the like; such a natural surfactant as saponin; such a cationic surfactant as a higher alkylamino acid, a quaternary ammonium salt, pyridine and other heterocyclic compounds, a phosphonium or a sulfonium, and the like; an anionic surfactant containing such an acidic group as tnose of carboxylic acid, sulfonic acid, phosphoric acid, sulfuric acid ester group, phosphoric acid ester group and the like, and such an amphoteric surfactant as an amino acid, aminosulfonic acid, sulfuric acid or phosphoric acid ester of aminoalcohol and the like.

Such surfactants capable of being served as an antistatic agent are described in, for example, U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, 3,545,974, and the like.

These surfactants are also allowed to add independently or in combination.

These surfactants are used in an amount of the range between 0.5 and 5% to binders used, and may be used independently or mixed with two or more kinds thereof.

The invention may be able to display relatively greater effects when a magnetic layer contains a polyurethane resin to serve as the binders, however, the magnetic layer may also contain other well-known resins.

When adding a cellulose derivative selected as the second binder component from among the other well-known resins, the cellulose derivative may easily be improved in dispersibility in the case of using the aforementioned solid particles or lubricant, and the layers of the invention may be improved in hardness to obtain stiff layers in the case of not using any of the solid particle or lubricant. It is, therefore, preferred that the cellulose derivative is added, so that a substantially more excellent effect can be displayed than in the case of using a urethane resin independently.

Such cellulose derivative capable of being used therein include, for example, a cellulose ether, a cellulose inorganic acid ester, a cellulose organic acid ester and the like. Such cellulose esters include, for example, methyl cellulose, ethyl cellulose, propyl cellulose, isopropyl cellulose, butyl cellulose, methylethyl cellulose, methylhydroxyethyl cellulose, ethylhydroxyethyl cellulose, carboxymethyl cellulose, carboxymethyl cellulose, sodium salt, hydroxyethyl cellulose, benzyl cellulose, cyanoethyl cellulose, vinyl cellulose, nitrocarboxymethyl cellulose, diethylaminoethyl cellulose, aminoethyl cellulose, and the like. Such cellulose inorganic esters include, for example, a nitrocellulose, sulfuric acid cellulose, phosphoric acid cellulose, and the like. And, such cellulose organic acid esters include, for example, an acetyl cellulose, propionyl cellulose, butylyl cellulose, methacryloy cellulose, chloracetyl cellulose, β-oxypropionyl cellulose, benzoyl cellulose, p-toluene sulfonic acid cellulose, acetyl propionyl cellulose, acetylbutylyl cellulose, and the like. Among the above-given cellulose derivatives, a nitrocellulose is preferred to use. The typical examples of such nitrocellulose include, for example, Cellunoba BTH ½ and Nitrocellulose SL-1 eacn manufactured by Asahi Kasei Co., Nitrocellulose RS ½ manufactured by Dainippon Celluloid Co. It is preferred that the viscosity of such nitrocelluloses specified in JIS, K-6703 (1975) is from 2 to 1/64 sec, and more preferably from 1 to ½ sec. that will result especially excellent effect.

As for the binders to be used in the backing layers of the invention, a thermoplastic resin, thermosetting resin, reaction type resin or the mixture thereof which have so far been well-known may be used, besides the above-mentioned urethane resins.

There may be used the thermoplastic resins each having a softening temperature of not higher than 150°

C. and an average molecular weight of the order of from 5,000 to 200,000. These termoplastic resins include, for example, a vinyl chloride-vinyl acetate copolymer, vinyl chloride-vinylidene chloride copolymer, vinyl chloride-acrylonitrile copolymer, acrylic acid ester-acrylonitrile copolymer, acrylic acid ester-vinylidene chloride copolymer, acrylic acid ester-styrene copolymer, methacrylic acid ester-acrylonitrile copolymer, methacrylic acid ester-vinylidene chloride copolymer, methacrylic acid ester-styrene copolymer, urethane-elastomer, nylon-silicon resins, nitrocellulosepolyamide resin, polyvinyl fluoride, vinylidene chloride-acrylonitrile copolymer, butadiene-acrylonitrile copolymer, polyamide resin, polyvinyl butylal, a cellulose derivative such as cellulose acetate butylate, cellulose diacetate, cellulose triacetate, cellulose propionate, nitrocellulose and the like, styrene-butadiene copolymer, chlorovinylether-acrylic acid ester copolymer, amino resin, and the mixtures thereof. The above-mentioned thermosetting resins or the reaction type resins are of not more than 200,000 in molecular weight in the state of a coating liquid, and there may be used those capable of being infinitive in molecular weight through a condensation, addition or the like by heating after coating and drying. Among them, the preferred ones are not softened or dissolved during the period until such resins are thermally decomposed. Such resins include, for example, a phenol resin, epoxy resin, polyurethane setting type resin, urea resin, melamine resin, alkyl resin, silicone resin, acryl type reactive resin, epoxy-polyamide resin, nitrocellulose-melamine resin, the mixture of a methacrylic acid salt copolymer and diisocyanate prepolymer, urea-formaldehyde resin, the mixture of a low molecular glycol/high molecular diol/triphenylmethanetriisocyanate, polyamine resin, urethane resin, and the like.

Besides the above-mentioned additives a dispersant, plasticizer, abrasive and the like may also be added into the magnetic layers and the backing layers of the invention, Such dispersants which are to be used in the invention include, for example, fatty acids each having 8 to 18 carbon atoms such as caprylic acid, capric acid, lauric acid, myristic acid, palmitic acid, stearic acid, oleic acid, elaidic acid, linolic acid, linolenic acid, stearolic acid and the like; a metal soap comprising an alkali metal such as Li, Na, K, etc., or an alkaline earth metal such as Mg, Ca, Ba, etc., of the above-mentioned fatty acid, lecithin; and the like. Besides the above, a higher alcohol having more then 12 carbon atoms, the sulfuric acid esters thereof, and the like may also be used. These dispersants are to be added in an amount within the range oetween one to 20 parts by weight per 100 parts by weight of binders used.

As for the aforementioned plasticizers, there may be used such a phosphate as triethyl phosphate, tris(2-ethylhexyl)phosphate, tributyl phosphate, tris(dichloropropyl)phosphate, trioctyl phosphate, tributoxyethyl phosphate, triphenyl phosphate, tricresyl phosphate and the like; such a phthalate as dimethyl phthalate, diethyl phthalate, dibutyl phthalate, diisobutyl phthalate, dicyclohexyl phthalate, diheptyl phthalate, dilauryl phthalate, butyllauryl phthalate, butylbenzyl phthalate and the like.

The magnetic layer of the invention is to be formed in such a manner that at least the binder of the invention is dissolved in an organic solvent and the resulting coating solution is coated over to a support.

The backing layer of the invention is to be formed in such a manner that the above-mentioned composition is dissolved in an organic solvent and the resulting coating solution is coated over to the opposite surface of the support to the surface thereof on which the magnetic layer is provided.

As for such supports, there may be used such a polyester as polypropylene and the like; such a polyoleffin as polypropylene; such a cellulose derivative as cellulose triacetate, cellulose diacetate and the like; such a plastic as polycarbonate; such a metal as Cu, Al, Zn and the like; a glassplate; a variety of ceramics such as the so-called new-ceramics. e.g., boron nitride and silicon carbide; and the like.

Such supports may be in any form of a tape, sheet, card, disk, drum and tne like, and various materials may be selected according to tne form thereof and to the purpose of using.

The tnickness of these supports is of the order of from about 3 to 100 $\mu$m and preferably from 5 to 50 $\mu$m in the case of tapes or sheets, and of the order of from 30 $\mu$m to 10 mm in the case of disks or cards. In the case of drums, the shape is to be in the form of cylinder and the type thereof is to be determined according to the recorders used.

As for the methods of forming a magnetic layer or of coating a backing layer of the invention by coating the aforementioned magnetic paints over to a support, there may be utilized such a method as a gravure-roll coating, wire-bar coating, doctor-blade coating, reverse-roll coating, dip coating, air-knife coating, calender coating, squeeze coating, kiss coating, fountain coating, and the like, and besides the above, the other methods may be applied. The details of these methods are described in 'Coating Engineering', published by Asakura Book Store, March, 1971, p. 258 and thereafter; and 'Plastic film-The Processes and the Application thereof', published by Giho-Do PubliShing Co., 1971.

Such magnetic layer coated over to a support in such a method as mentioned above is to be dried after applying a process for orienting magnetic powders relating the invention in the layer if necessary, so that a magnetic recording medium is manufactured by applying thereto a surface smoothing process and cutting into a desired form, if required.

As for such organic solvents which are to be used in coating process, there may be used such a ketone as acetone, methylethyl ketone, i.e., MEK, methylisobutyl ketone, i.e., MIBK, cyclohexane and the like; such an alcohol as methanol, ethanol, propanol, butanol and the like; such an ester as methyl acetate, ethyl acetate, butyl acetate, ethyl lactate, glycol acetate, ethylene glycoldimethylether and the like; such an ether as ethyleneglycol methylether, diethyleneglycolmonoethylether, dioxane tetrahydrofran, i.e., THF, and the like, such an aromatic hydrocarbon as benzene, toluene, xylene and the like; and such a halogenated hydrocarbon as methylene chloride, ethylene chloride, carbon tetrachloride, chloroform, ethylene chlorohydrin, dichlorobenzene and the like.

As for the magnetic layers of a magnetic recording medium of the invention, there may be used such a magnetic layer as has so far been well known including, for example, a magnetic layer principally comprising magnetic powders and binders.

As for such magnetic powder which are to be used in the invention, there may be used such a magnetic powder as is publicly known including, for example, $\gamma$-

$Fe_2O_3$, Co-containing $\gamma$-$Fe_2O_3$, $Fe_3O_4$, Co-containing $Fe_3O_4$, $CrO_2$, Fe, Fe-Ni, Co-Ni-P alloy, Co-Ni-Fe alloy and the like, and they are described in, for example, Japanese Patent Examined publication Nos. 4090/1969, 18372/1970, 22062/1972, 22513/1972, 38755/1971, 4286/1972, 12422/1972, 17284/1972, 18509/1972, 18573/1972 and the like.

The proportion of the mixture of such magnetic powder and binder to be used is within the range of from 10 to 200 parts by weight of the binder per 100 parts by weight of ferromagnetic powder.

EXAMPLES

The invention will now be described more detailedly in reference to the following examples of the invention. It is to be understood easily that various changes in the components, proportion, operational order and the like may be assorted to without departing from the spirit of the invention or sacrificing any of the advantages thereof.

Accordingly, it is to be understood that the invention shall not be limited to the following examples.

EXAMPLE 1

A magnetic paint composition shown in the following Table-1 was prepared by making use of Crisbon 4261, a urethane resin manufactured by Dai Nippon Ink Chemical Co., Ltd. and VAGH, a partially hydrolyzed vinyl chloride-vinyl acetate copolymer manufactured by Union Carbide Co., Ltd. each for serving as the binders thereof.

TABLE 1

| Name of Additive | Composition |
| --- | --- |
| Magnetic powder (Co-containing $\gamma$-$Fe_2O_3$) g | 60 |
| VAGH (Amount of solids g) | 4 |
| Crisbon 4216 (Amount of solids g) | 16 |
| Lecithin g | 2 |
| MEK ml | 80 |
| Toluene ml | 80 |
| THF ml | 80 |

The above composition was mixed and dispersed throughly with a ball-mill and then added with 5 parts of Colonate L, an ethyl acetate solution of 75% by weight of 1 mol of trimethylol propane and 3 mol of tolylenediisocyanate addition product, i.e., a polyisocyanate, manufactured by Ninon Polyurethane Co., Ltd., so that they were mixed together uniformly. The resulting mixture was divided into ten samples and thereto the compounds of the invention were added respectively, so that the magnetic paints were prepared, as shown in Table 2.

These magnetic paints were coated over to the surface of polyethyleneterephthalate films of 5 $\mu$m in thickness with applying thereto magnetic fields each of 2,000 Gauss, and dried so that the dried thickness thereof could be 5 $\mu$m, provided that the density of the fungicides each indicate the density to the dried compositions, respectively.

The fungicide effects were measured on the magnetic recording media thus prepared in the following method. The results thereof are shown in Table 2.

Method of evaluating the fungicide effects

*Chaetomium globosum:* ATCC 6205
*Cladosporium herbarum:* IAM.F.517
Trichoderma: T-1 ATCC 9645
*Aspergillus penicilloides:* IAM 2772
*Aspergillus restrictus:* AHU 7422

Spores were taken once by making use of a platinum loop from each of the slant culture media of the above-mentioned five kinds of strains and were suspended in 5 ml of pasteurized water in which Tween 80 was added in an amount of 0.05% of the water, so that five kinds of unispore suspension liquids were prepared, respectively. Then, a mixed spore suspension liquid was made by taking the same amount of each of the five unispore suspension liquids and mixing up together.

Next, a test piece of 50 ×50 mm in size was flatly placed so as to make the magnetic layer thereof upside in the center of a hot-air sterilized Petri dish of 90 mm in diameter, and was sprayed with 0.5 cc of the mixed sporesuspension liquid and was then allowed to stand for a week in a place where the temperature and the humidity were kept at 28±2° C. and 95~99% respectively. After then, how fungus grow was judged and evaluated.

The results of such evaluation are indicated by ⊚, O, Δ and x respectively in order from an excellent result to a had result depending upon what degree the hypha grows to.

⊚ represents 'very excellent' (Almost no fungus grows.)
O represents 'good' (Negligible fungus grow.)
Δ represents 'fair' (Slight fungus grow.)
x represents 'bad' (Many fungus grow.)

A chroma-noise was measured on the other sample magnetic recording media each provided by cutting into a half inch in width and by taking up about an open reel. Each result of chroma-noise measurements made on Samples from No. 2 to No. 10 was standardized in terms of Sample No. 1.

Such chroma noise indicates a ratio of an effective value of a chroma signal to a noise level from which the level of the chroma signal is excluded. Such effective value of a chroma signal may be obtained by such a way that a chroma signal of 3.58 MHz is set to 0.714 Vp-p to record an image by putting the chroma signal on a brighthess signal and the image is reproduced and then only the chroma signal is picked up.

The results therefrom are also shown in Table 2.

A further sample set of the magnetic recording media was cut into a half inch in width, and was loaded in video-cassettes, so that the tests were tried for the running stability after 200 times. The results therefrom are also shown in Table 2.

The evaluation of the running stability was classified into O, Δ, and x in order from the good results from the practical viewpoints based on the judgements of tape-crease and irregular edges.

A still further sample set of the magnetic recording madia was cut into a half inch in width, so that adhesion tests were tried by making use of cellulose tapes. The results therefrom are also shown in Table 2.

The evaluation of such adhesion was made in such a manner that, when a piece of tape is pressed on the magnetic layer of each sample and is then peeled it off, the peeling condition is judged with the naked eye. ⊚ denotes that a very few peeling was found, and O denotes that a little peeling was found. The results were evaluated in comparison witn the results obtained from Sample No. 1.

TABLE 2

| Sample No. | Fungicide Exemplified Compound | Amount added (ppm) | Effect Fungicide effect | Chroma-noise (dB) | Running-stability | Adhesiveness |
|---|---|---|---|---|---|---|
| 1 | — | — | x | 0.0 | Δ | ○ |
| 2 | 1 | 100 | ⊚ | +0.1 | ○ | ○ |
| 3 | 2 | 300 | ○ | +0.1 | ○ | ○ |
| 4 | 3 | 100 | ○ | 0.0 | ○ | ○ |
| 5 | 4 | 1000 | ⊚ | 0.0 | ○ | ○ |
| 6 | 5 | 100 | ⊚ | 0.0 | ○ | ○ |
| 7 | 6 | 100 | ○ | +0.1 | ○ | ○ |
| 8 | 7 | 100 | ○ | 0.0 | ○ | ○ |
| 9 | 8 | 1000 | ○ | 0.0 | ○ | ○ |
| 10 | 9 | 500 | ○ | 0.0 | ○ | ○ |

It is found from the Table 2 that Samples No. 2 to 10 are very high in resistivity against fungus and at the same time are not inferior to others in chroma characteristics, running stability and adhesiveness.

EXAMPLE 2

| | |
|---|---|
| Co-containing γ-Fe$_2$O$_3$ magnetic powder | 270 parts by weight |
| VAGH (vinyl chloride-vinyl acetate-vinyl alcohol copolymer mfd. by Union Carbide Co., U.S.A.) | 40 parts by weight |
| Bandex T-5201 (Urethane elastomer, mfd. by Dai Nippon Ink Chemical Co., Ltd.) | 40 parts by weight |
| Colonate L (Trifunctional low molecular weight isocyanate compound, mfd. by Nippon Urethane Ind. co.) | 20 parts by weight |
| HS-500 (Carbon black, mfd. by Asahi Carbon Co., Ltd.) | 34 parts by weight |
| α-Fe$_2$O$_3$ powder | 11 parts by weight |
| Methylisobutyl ketone | 420 parts by weight |
| Toluene | 420 parts by weight |

The above-mentioned composition was mixed up and dispersed by making use of a ball-mill, so that a magnetic paint was prepard, provided that the compounds of the invention were added in the magnetic paint so that the concentration of the compounds could be as shown in Table-3. The resulted magnetic paint was coated over to the both sides of a polyester film of 75 μm in thickness so that the thickness of the coated paint could be 3 μm in dried thickness and then dried to form a magnetic layer. Next, the magnetic layered film was dipped for a short time in an impregnation solution comprising 50 parts by weight of oleic acid and 1,000 parts by weight of normal hexane and dried. Then, a magnetic disk was made by stamping out disks from the magnetic layered film.

The magnetic disks were put to tests to evaluate the fungicide effects in the same manner as was taken in Example 1. The results therefrom are shown in Table 3.

The evaluation of the fungicide effects and durability were made in the similar manner taken in the example.

On the other hand, with the purpose of checking up the durability of the magnetic disks, there measured the necessary running time of the disks each to be taken until the reproduction output could be up to 50% of the initial output by taking steps that each magnetic disk was inserted in a stain protective jacket and loaded in a record-reproducing device, and then a magnetic head was brought into contact with the disk at a pad-pressure of 25 g/cm$^2$ to slidably touching on the running disk at 10 mm/sec.

The results thereof are shown in Taole 3, below:

TABLE 3

| Sample No. | Fungicide Exemplified compound No. | Amount added (ppm) | Effect Fungicide effect | Durability (time) |
|---|---|---|---|---|
| 11 | — | — | x | 15 |
| 12 | 1 | 100 | ⊚ | 15 |
| 13 | 4 | 300 | ⊚ | 16 |
| 14 | 7 | 100 | ○ | 15 |
| 15 | 9 | 300 | ○ | 15 |
| 16 | 11 | 100 | ○ | 16 |
| 17 | 12 | 100 | ○ | 15 |
| 18 | 13 | 300 | ○ | 15 |
| 19 | 14 | 100 | ○ | 16 |
| 20 | 15 | 300 | ○ | 15 |

It was found from Table 3 that the magnetic disks produced in the invention have fungicide effects and almost no deterioration of the durability even if an fungicide was used.

EXAMPLE 3

A backing layer of 1 μm in dried thickness was formed in the manner that the composition comprising the materials shown in Table 4 below was coated as a backing layer over to a polyethylene-terephthalate film of 15 microns in thickness, provided that an fungicide was added in the composition as shown in Table 5. The concentration of the fungicide indicates a concentration to the dried composition.

TABLE 4

| Name of material | Amount added | Remark |
|---|---|---|
| Nipporun N-3022 | Solid contents 2.7 g | Urethane resin, mfd. by Nippon Urethane Co. |
| Byron-200 | Solid contents 0.2 g | Polyester resin, mfd. by Toyo Boseki Co. |
| Nitrocellulose | Solid contents 0.2 g | |
| MEK | 50 ml | Methylethyl ketone |
| MIBK | 50 ml | Methylisobutyl ketone |

TABLE 5

| Sample No. | Fungicide Exemplified Compound | Amount added (ppm) | Fungicide effect | Adhesiveness | Running stability |
|---|---|---|---|---|---|
| 21 | — | — | x | Δ | ○ |
| 22 | 1 | 100 | ○ | ○ | ○ |
| 23 | 2 | 300 | ○ | ○ | ○ |
| 24 | 3 | 100 | ○ | ○ | ○ |
| 25 | 4 | 1000 | ○ | ○ | ○ |
| 26 | 5 | 100 | ○ | ○ | ○ |
| 27 | 6 | 100 | ○ | ○ | ○ |
| 28 | 7 | 100 | ○ | ○ | ○ |
| 29 | 8 | 1000 | ○ | ○ | ○ |
| 30 | 9 | 500 | ○ | ○ | ○ |

Next, the magnetic paint composition shown in Table-6 was prepared by making use of Crisbon 4216 manufactured by Dai Nippon Ink Chemical Co., i.e., urethane resin, and VAGH each serving as the binder.

TABLE 6

| Additive | Composition |
| --- | --- |
| Magnetic powder (Co-containing γ-Fe$_2$O$_3$) g | 60 |
| VAGH (Solid content g) | 4 |
| Crisbon 4216 (Solid content g) | 16 |
| Lecithin g | 2 |
| MEK ml | 80 |
| Toluene ml | 80 |
| THF* ml | 80 |

*THF: Tetrahydrofran

The above-mentioned composition each was mixed up together and dispersed thoroughly and was then added with 5 parts of Colonate L, polyisocyanate, manufactured by Nippon Polyurethane Co., i.e., a 75% by weight ethyl acetate solution comprising 1 mol of trimethylol propane and 3 mol of tolylenediisocyanate addition products, and was further mixed up uniformly so as to prepare a magnetic paint.

The resulted magnetic paint was coated, with applying a magnetic field of 2,000 Gauss, to one side of a polyethylene-terephthalate film opposite to the aforementioned backing layer, and dried, so that the dried thickness could be 5 μm.

The fungicide effects of the resulted magnetic recording medium were measured in the following method, and the results therefrom are shown in Table 5.

Method of evaluating the fungicide effect

Chaetomium gobosum: ATCC 6205
Cladosporium herbarum: IAM.F.517
Trichoderma T-1: ATCC 9645
Aspergillus penicilloides: IAM 2772

Spores were taken once by making use of a platinum loop from each of the slant culture media of the above-mentioned 4 kinds of strains and were suspended in 5 ml of pasteurized water in which Tween 80 was added in an amount of 0.05% of the water, so that 4 kinds of unispore suspension liquids were prepared, respectively. Then a mixed spore suspension liquid was prepared by taking the same amount each of the 4 kinds of the unispore suspension liquids and by mixing up altogether.

Next, a test piece of 50×50 mm in size was placed flatly so as to make the magnetic layer thereof upside in the center of a hot-air sterilized Petri dish of 90 mm in diameter, and was sprayed over with 0.5 ml of the mixed spore suspension liquid, and was then allowed to stand for a week in a place where the temperature and the humidity were kept at 28±2° C. and 95~99%, respectively. After then the growth of fungus was judged and evaluated.

In evaluation, x represents a growtn of fungus and o represents no growth thereof.

Another sample magnetic recording medium was cut into a half inch wide and taken up about an open reel, and was allowed to stand under the high temperature and humidity conditions (at 50° C. and 70% RH) for 24 hours. After then, the adhesiveness of the backing layer to the magnetic layer was studied. The results thereof are shown in Taole 5. In the Table 5, the evaluation of the adhesiveness is classified into O, Δ, x, respectively in order from a good adhesiveness to a bad one based on the practical adhering power.

A further sample magnetic recording medium was cut into a half inch wide and was loaded in a video-cassette, so that a running test was tried after 200 times. The results thereof are shown in Table 5.

In Table 5, the evaluation of the running test was classified into O, Δ, x, in order from the good result, from the viewpoints based on the practical judgements of tape-crease and irregular edges.

As is obvious from Table 5, it is found that Sample Nos. 22 to 30 relating to the invention are high in resistivity against fungus, and at the same time excellent in adhesiveness and running stability.

What is claimed is:

1. A magnetic recording medium having a magnetic layer and optionally a backing layer, wherein at least one of said magnetic layer and said backing layer contains a fungicide selected from the group consisting of
   2-(4-thiazolyl) benzimidazole,
   N-(fluorodichloromethylthio)-phthalimide,
   N,N-dimethyl-N'-fluorodichloromethylthio-sulfamide  2,3,5,6-tetrachloro-4-methylsulfonyl-pyridine,
   2-octylisothiazoline-3-one,
   hexahydro-1,3,5-tris-(2-hydroxyethyl)-sym-triazine,
   benzylbromoacetate,
   2-pyridinethiol sodium-1-oxide,
   potassium-N-hydroxymethyl-N-methylthiocarbamate and
   dithio-2', 2' bis (benzomethylamide).

2. The magnetic recording medium as claimed in claim 1, wherein said magnetic layer contains said fungicide.

3. The magnetic recording medium as claimed in claim 2, wherein said magnetic layer contains a polyurethane resin.

4. The magnetic recording medium as claimed in claim 2 wherein said content of fungicide is in the range of from 100 ppm to 2,000 ppm based on the total binder contained therein.

5. The magnetic recording medium as claimed in claim 3, wherein said magnetic layer contains an isocyanate.

6. The magnetic recording medium as claimed in claim 2, wherein said magnetic layer contains a dispersant, an abrasive, a lubricant or an antistatic agent.

7. The magnetic recording medium as claimed in claim 2, wherein said magnetic layer contains a magnetic powder selected from the group consisting of γ-Fe$_2$O$_3$, Co-containing γ-Fe$_2$O$_3$, Fe$_3$O$_4$, Co-containing γ-Fe$_3$O$_4$, CrO$_2$, Fe, Fe-Ni, Co-Ni-P alloy, Co-Ni-Fe alloy and Ni-Fe alloy.

8. The magnetic recording medium as claimed in claim 1, wherein said backing layer contains said fungicide.

9. The magnetic recording medium as claimed in claim 8, wherein said backing layer contains a polyurethane resin.

10. The magnetic recording medium as claimed in claim 9, wherein said backing layer contains an isocyanate.

11. The magnetic recording medium as claimed in claim 8, wherein said backing layer contains a dispersant, an abrasive, a lubricant, or an antistatic agent.

12. The magnetic recording medium as claimed in claim 8, wherein said backing layer contains said fungicide in the range of from 200 ppm to 2,000 ppm against the total binder contained therein.

* * * * *